United States Patent [19]
May et al.

[11] 3,735,897
[45] May 29, 1973

[54] SELF SERVICE DISPENSING REMOTE CONTROL SYSTEM

[75] Inventors: Larry A. May, Jonesboro; Glenn A. Jones, Mosheim, both of Tenn.

[73] Assignee: Keene Corporation, New York, N.Y.

[22] Filed: Mar. 4, 1971

[21] Appl. No.: 120,815

[52] U.S. Cl. .................................................. 222/16
[51] Int. Cl. .................................................. B67d 5/30
[58] Field of Search ................... 222/39, 28, 23-27, 222/14-22, 29-38

[56] References Cited

UNITED STATES PATENTS

| | | | |
|---|---|---|---|
| 2,547,967 | 4/1951 | Patten | 222/35 |
| 3,613,950 | 10/1971 | Sauber | 222/16 |

*Primary Examiner*—Stanley H. Tollberg
*Attorney*—Jeffers and Rickert

[57] ABSTRACT

The specification discloses a remote control system, especially for self-service fuel, chemical, or other liquid dispensing pumps in which each dispensing pump is provided with a call switch which actuates a signal in a remote location whereupon the operator in a remote location can enable the respective dispensing pump to dispense fuel. The remote location is operable for monitoring the quantity of fuel dispensed and can include counter means for totalizing or limiting the quantity dispensed from each of a plurality of remote controlled dispensing pumps.

The signal which is actuated in the remote station consists of visual signal, such as a lamp, and an audible signal, such as a bell or buzzer, with the audible signal sounding only so long as the customer has the button of the call switch depressed at the respective dispensing pump, while the visual signal remains illuminated after the button on the dispensing pump is released. When the operator in the remote location takes the action necessary to enable the dispensing pump, the visual signal in the remote station is extinguished.

11 Claims, 5 Drawing Figures

PATENTED MAY 29 1973　　　　　　　　　　　　　　　　3,735,897

INVENTORS
LARRY A. MAY
BY GLENN A JONES
Jeffers & Rickert
Attorneys

SELF SERVICE DISPENSING REMOTE CONTROL SYSTEM

The present invention relates to call signals and the like, especially for use in connection with remote control equipment such as is employed in stations where customers draw their own fuel, chemicals, or other liquids from dispensing pumps.

Dispensing pumps for use with the present invention include an arrangement for supplying counting pulses to a remote station where the pulses are counted to determine the amount dispensed and, therefore, the cost thereof, or where the pulses count down a counter on which a quantity conforming to a certain prepayment is set. In the last mentioned case, the pump automatically stops dispensing when the count in the storage system has been completely run off.

Whether the system is of the prepay type, or the post pay type, it is advisable to monitor the customer operated pumps and the present invention relates to such a monitoring system in which an operator in a remote station can monitor a plurality of dispensing pumps and control the enabling of the pumps and either preset or measure the quantity dispensed from each on each occasion of operation thereof. Further, one or more totalizing counters could be included in the remote station to keep count of total amounts dispensed over a certain period of time.

A particular object of the present invention is the provision of a relatively simple self-service call signal arrangement for use in connection with a self-service dispensing system of the nature referred to.

Still another object of the present invention is the provision of a self-service call signal arrangement which is relatively inexpensive and easy to maintain in operation.

A still further object is the provision of a self-service call signal which will provide an audible signal to the remote control equipment operator for generally alerting the operator while there is associated with each pump a signal lamp which becomes illuminated simultaneously with the sounding of the audible signal and which remains illuminated until the remote control equipment operator enables the respective pump.

The foregoing objects of the present invention as well as still other objects and advantages thereof will become more apparent upon reference to the following detailed specification taken in connection with the accompanying drawings, in which:

FIG. 1 is a schematic representation of a self-service fuel dispensing pump and a remote control station connected thereto;

FIG. 2 schematically shows the electrical circuitry leading between the pump and the control station and the principal components in the pump and control station;

BRIEF SUMMARY OF THE INVENTION

According to the present invention, self-service dispensing pumps for fuel, chemicals, or other liquids, are provided which can be operated by a customer. Prior to placing a dispensing pump in operation, however, the customer is required to actuate a call switch on the respective dispensing pump which gives a signal in a remote location which is manned by an operator. The signal in the remote location consists of an audible signal to alert the operator and a signal lamp which becomes illuminated and remains illuminated until the remote operator enables the respective dispensing pump or takes whatever suitable action is necessary.

An important part of the aforementioned call signal is a unitary device containing the signal lamp and the means for retaining the lamp illuminated until the dispensing pump pertaining thereto is enabled and which forms a relatively inexpensive simple unit located in and forming a part of the remote control station.

Figure 1:
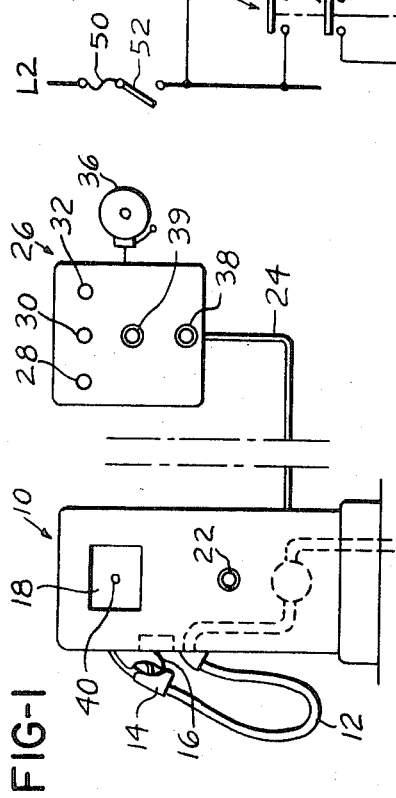

DETAILED DESCRIPTION:

Referring to the drawings somewhat more in detail, in FIG. 1, reference numeral 10 indicates a dispensing pump which is, basically, a conventional type, and which includes a dispensing hose 12 with a nozzle 14 on the end thereof which, when the pump is idle, may be suspended from a hook 16 on the side of the dispensing pump housing. Hook 16, or a handle, control switches in the unit. The housing has a window 18 through which can be viewed the indicating dials of the pump and which ordinarily comprise price and quantity indicating dials.

The dispensing pump includes a meter connected to drive the dials which are visible through window 18, and also connected to the meter, or actuated by the cost dials, is an arrangement for supplying counting pulses which are delivered via a suitable circuit to the remote station. The remote station includes a counter receiving the pulses and may compute the cost of the amount dispensed for post payment by the customer. Alternatively, the counter in the remote station may be preset in conformity with a prepaid amount and the pulses will then count the counter down and shut off delivery from the pump when the preset quantity has been delivered.

The housing of the dispensing pump 10 also includes a push button station at 22, forming a customer actuated call switch, which is depressed by the customer when it is desired to draw from the respective dispensing pump. Switch 22, and at least the counting pulse mechanism and the on-off control, are connected by an electric cable 24 with a remote control station, generally indicated at 26, and which comprises a set of instrumentalities for each of the dispensing pumps to be controlled from the station.

In FIG. 1, only a single dispensing pump and a single set of instrumentalities in the remote control station are illustrated, but it will be understood that as many dispensing pumps as desired could be provided to be controlled by the remote control station, and the remote control station would have a set of the said instrumentalities for each of the said dispensing pumps.

The panel shown at 26 in FIG. 1 includes a ready light 28 which becomes illuminated when the operator takes the first step to enable the respective dispensing pump 10 to operate. The panel comprises a second signal lamp 30 which becomes illuminated when the dispensing pump pertaining thereto commences to operate while simultaneously the lamp at 28 will be extinguished.

A third lamp at 32 becomes illuminated when the supply of power for operation of the remote control station and the dispensing pump has been established.

Also carried on the panel in the remote control station is a visual signal in the form of signal lamp 38 which is illuminated when the customer actuates call switch 22 on the respective dispensing pump. The remote station also comprises an audible signalling device 36, such as a buzzer or bell, and which will sound as long as any of the switches 22 on any of the dispensing pumps is in actuated position. When the call switch 22 is released, audible signal 36 will cease sounding but lamp 38, however, will remain illuminated until the remote control operator takes the action which will enable the respective dispensing pump to dispense.

For enabling the respective dispensing pump to dispense, the panel 26 includes an enabling switch 39 which is actuated momentarily and then released. When switch 39 is actuated and then released, a signal light on the respective dispensing pump at 40 will become illuminated indicating that the pump is ready for dispensing and the customer can then turn the dispenser handle on and draw from the pump up to the amount that has been stored in the storage arrangement if prepayment has been made.

At the end of a dispensing operation, after prepayment, solenoid valve means first slow down and then interrupt delivery and the dispenser handle can be turned to off position and the lamp 40 will become extinguished and the pump motor will shut off. The dispensing pump cannot thereafter dispense until the dispensing pump is again enabled by the remote operator. If post payment is to be made, the customer shuts off the pump by turning the handle to off position when the desired amount has been dispensed and the amount due is then readable in the remote station.

Figure 2:
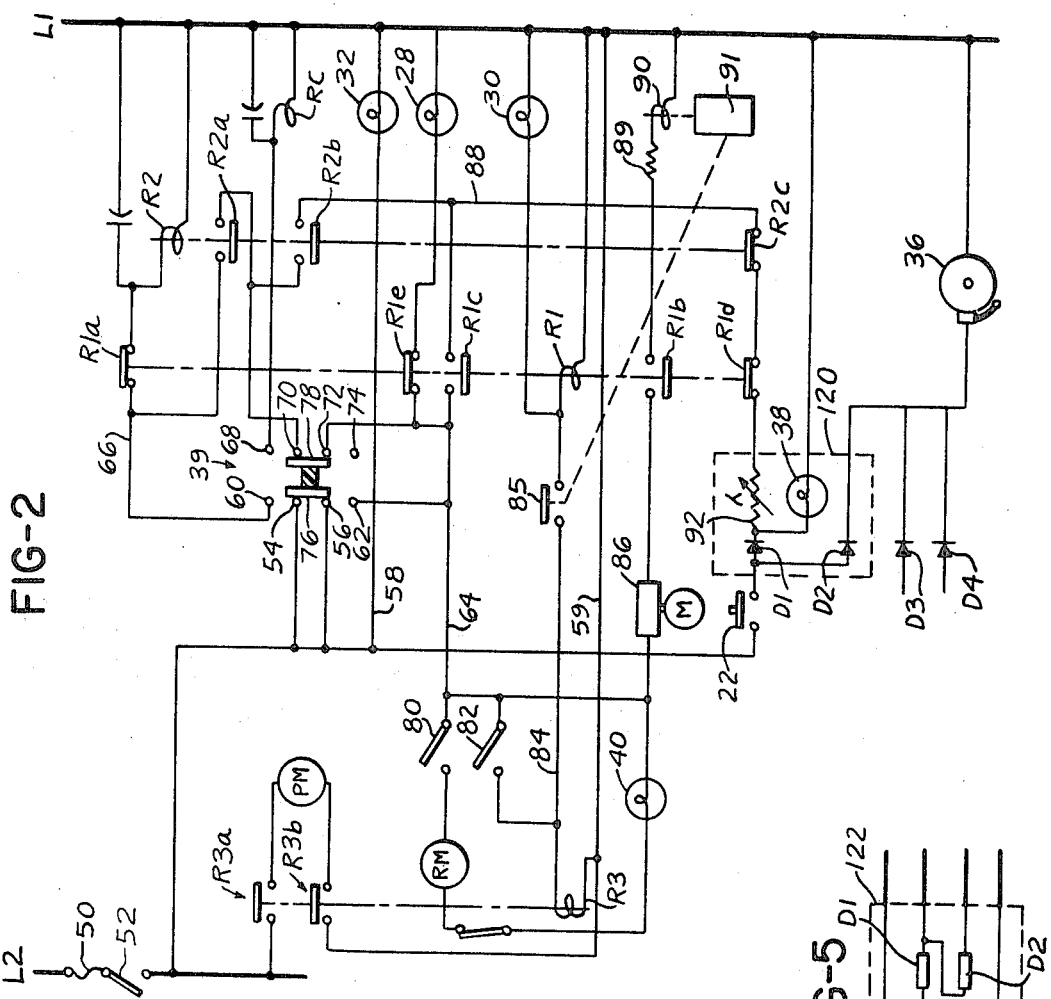

Turning now to the circuitry for accomplishing the foregoing, reference may be had to FIG. 2 which schematically illustrates the adaptation of the present invention to one dispensing arrangement. In FIG. 2, L1 and L2 indicate power lines which may be A.C. or D.C., as might be desired.

Leading from line L2 is a connection containing a fuse 50 and an on-off switch 52 and leading from switch 52 to a terminal 54 associated with the aforementioned switch 39 which is under the control of the operator at the remote station. Switch 39 also comprises a terminal 56 connected with terminal 54 and also connected to a wire 58. Switch 39, furthermore, comprises terminals 60 and 62, the latter being connected to a wire 64 and the former being connected to a wire 66 leading to one side of a relay blade R1a which is normally closed and which, on its side opposite wire 68 is connected through the coil of a relay R2 with power line L1.

Switch 39 also comprises contact 68 opposed to contact 60, contact 70 opposed to contact 54, contact 72 opposed to contact 56 and an idle contact 74 opposed to contact 62. Switch 38 comprises a slider contact element 76 on the same side as contact elements 54, 56, 60 and 62 and another slider contact element 78 on the side of the switch adjacent contact elements 68, 70, 72 and 74. The contact elements 76 and 78 are interconnected by an insulator and move as a unit.

Switch 39 is normally in the position shown wherein contact element 76 bridges contacts 54 and 56, while contact element 78 bridges contacts 70 and 72. The switch 39 can be operated to move the contact elements upwardly in FIG. 2 to cause contact element 76 to bridge contacts 54 and 60, while contact element 78 bridges contacts 70 and 68.

As will be seen hereinafter, this last mentioned movement of the switch is momentary and the switch will return to the position in which it is illustrated in FIG. 2 when the switch is released. Switch 39 can also be moved downwardly to cause contact element 76 to bridge contacts 56 and 62 to permit manual operation of the respective dispensing pump.

Contact 68 is connected to one side of a reset coil marked RC, the other side of which is connected with line L1. The reset coil, when energized, sets the counter mechanism in the remote station back to zero so that the next delivery of the respective dispensing pump can be monitored.

Contact 70 is connected with one side of a blade R2a of relay R2 which is normally open and the other side of which is connected to wire 66. Contact 70 is also connected with one side of a second blade R2b of relay R2, which is normally open, and the other side of which is connected to wire 58 and which wire, at the remote station is connected through lamp 32 with power line L1. Wire 58 also leads to the dispensing pump and is connected to one side of call switch 22.

An automatic dispenser computer resetting mechanism, which is indicated at RM in FIG. 2, has one side connected by wire 59 to line L1 while the other side is connected through a switch blade 80 to wire 64. Wire 64 is also connected via normally closed blade R1e of relay R1 and lamp 28 to line L1. Switch blade 80 is one blade of a switch operated by the aforementioned hook, or dispenser handle, 16. When nozzle 14 is lifted from hook 16, or when the dispenser handle is turned on, blade 80 will close as will also another blade 82 of the switch which is connected between wire 64 and another wire 84 leading back to the remote station and connected to one side of the coil of relay R1, the other side of which is connected with line L1. Connected in parallel with the coil of relay R1 is the aforementioned signal lamp 30 and the coil of a pump motor control relay R3.

Wire 64 is also connected to one side of the aforementioned lamp 40, the other side of which is connected with wire 59 so that lamp 40 will become illuminated when wire 64 is energized showing that the dispensing unit is enabled for dispensing fluid.

Wire 64, at the dispensing unit, is also connected to one side of a component 86, the other side of which is connected with one side of the normally open blade R1b, the other side of which is connected through a resistor 89 with one end of a count coil 90, the other side of which is connected with line L1 and which actuates a counter 91. The component 86 is only schematically illustrated and it consists, as mentioned before, of an arrangement for supplying pulses corresponding to the quantity delivered by the respective dispensing pump. Component 86 is operated by meter M which measures the quantity of fluid being dispensed in the dispensing device, or by the dial mechanism driven by the meter.

Relay R1 has a further blade R1c which is normally open and which on one side is connected to wire 64 and on the other side is connected to a wire 88 leading from the aforementioned wire 58 to one side of normally closed blade R2c, of relay R2, the other side of which is connected with one side of a normally closed blade R1d of relay R1. The other side of R1d is connected to one end of a light sensitive resistor element 92, the other end of which is connected to one side of a diode D1.

The said one side of diode D1 is also connected to one side of the aforementioned call signal lamp 38, the other side of which is connected with wire L1. The lamp 38 is positioned to illuminate resistor 92 so that when the light is illuminated the resistance of resistor 92 is relatively low, whereas when the light is extinguished the resistance of resistor 92 is high.

The other side of diode D1 leads to one side of the aforementioned customer operated switch 22, the other side of which, as mentioned, is connected with wire 58. The side of diode D1 opposite lamp 38, namely, the side of diode D1 connected to switch 22, is connected through another diode D2 with one side of an audible signalling device 36, the other side of which is connected with L1. Other diodes D3 and D4 can also be connected to audible signalling device 36 so that device 94 can be actuated from any of several different dispensing pump call switches, while lamp 38 will only become illuminated when the respective switch 22 pertaining thereto is depressed by a customer.

Thus, the audible signal 36 will sound whenever any of the switches 22 pertaining to the several dispensing pumps is actuated, whereas each lamp 38 will become illuminated only when the pertaining switch 22 is actuated. The control system is arranged so that when a switch 22 is actuated, the respective lamp 38 becomes illuminated and the audible signal sounds and, when the switch is released, the audible signal ceases sounding, while the respective lamp pertaining thereto remains illuminated until the remote station operator take suitable action.

In operation, a customer desiring to draw from a dispensing pump will actuate the switch 22 of the respective dispensing pump. When switch 22 is actuated, a circuit is completed from line L2 through wire 58 and switch 22 and diode D1 to visual lamp 38 to cause the lamp to become illuminated.

Simultaneously, a circuit is completed through diode D2 to the audible signalling device 36 and this will sound to alert the remote operator. The illumination of lamp 38 illuminates light sensitive resistor 92 and reduces the resistance thereof so that after the customer releases switch 22 and the audible signal ceases, lamp 38 will remain illuminated because of the current supply thereto through wires 58 and 88, normally closed blades R2c of relay R2 and R1d of relay R1 and resistance 92 to the side of lamp 38 nearest diode D1.

Thus, after the audible signal sounds to alert the remote station operator, he has merely to observe the control board to determine from which dispensing pump the call signal originated.

Assuming that a respective dispensing pump is to be enabled, the remote operator will actuate switch 39 to move contact elements 76 and 78 upwardly from the FIG. 2 position thereof to bridge contacts 54 and 60 on the one hand and contacts 68 and 70 on the other hand, and the switch 38 is then permitted to return to its FIG. 2 position.

When the contact elements of switch 39 are moved upwardly, energy will be supplied from contact 54 to contact 60 and then through normally closed blade R1a of relay R1 to one side of the coil of relay R2 and from the other side thereof back to line L1. This will cause relay R2 to become energized and a holding circuit will be established therefor through the aforementioned blade R1a and through the now closed blade R2a of relay R2 and then through the now closed blade R2b of relay R2 back to wire 58 which is connected to line L2. Energization of relay R2 will open its blade R2c and interrupt the supply of current through resistor 92 to lamp 38 so that this lamp will become extinguished and will remain extinguished until the call switch 22 is again depressed for another dispensing operation. Further, energization of R2 will energize lamp 28 via normally closed blade R1e of relay R1.

It will be noted that, at this time, lamps 28 and 32 are illuminated while lamp 30 at the remote station is not yet illuminated. Lamp 40 at the dispensing pump is now illuminated because the wire 64 is now energized via its connection to contact 72 which is connected with contact 70 via the contact element 78 while contact 70 is connected with wire 58 through blade R2b of the now energized relay R2.

Upon removing nozzle 14 from hook 16, or by turning the dispenser handle to on position, the dispensing pump is prepared to dispense. As mentioned, when nozzle 14 is lifted from hook 16, switch blades 80 and 82 close. Closing of switch blade 80 enables unit RM while closing of switch blade 82 is operable for connecting the now energized line 64 to wire 84 leading to one side of each of the coils of relay R1 and R3, the other sides of which are connected with line L1. Closing of switch blade 82 will, thus, energize relay R1 and simultaneously cause lamp 30 at the remote control station to become illuminated showing that the pump is being operated, or is fully prepared to operate. Also, energization of relay R3 will close its blades R3a and R3b and energize pump motor P.M.

Energization of relay R1 will open its normally closed blade R1a, thereby interrupting the supply of energy to the coil of relay R2 and to lamp 28 so that relay R2 will open and lamp 28 will become extinguished. Energization of relay R1 will also close its normally open blades R1c and R1b and open its normally closed blades R1d and R1e.

When relay R2 is deenergized, its blades R2a and R2b open and its blade R2c closes. The closing of blade R2c is without effect, however, because, simultaneously, blade R1d of relay R1 in series therewith opens so that there is no supply of energy to resistor 92 in lamp 38.

Closing of blade R1b of relay R1 connects the meter driven pulse developing component 86 with the counter coil 90 so that the amount dispensed by the dispensing pump is registered on the pertaining counter 91 at the remote station.

The closing of blade R1c establishes the circuit from wire 58 to wire 64 which was interrupted by deenergization of relay R2 so the supply of power to the dispensing pump is maintained.

The opening of blade R1e of relay R1 interrupts the energizing circuit to signal light 28.

In a prepay system, the line leading to the coil of relay R1 may have a switch 85 therein which opens when a count corresponding to a prepaid amount of money has been counted off on counter 91 by pulses supplied to coil 90 from component 86. In a post pay system, counter 91 will indicate the quantity dispensed and which is to be paid for.

The dispensing unit can be enabled in an emergency situation by manually moving switch 39 downwardly to connect contact 56 to contact 62 and supply power to wire 64.

The indicating dials on the dispensing pump can be reset to zero at the end of a dispensing operation, or immediately prior to a dispensing operation by known means operated from the remote station, or the on-off handle of the dispensing unit can perform this function.

Figures 3, 4:
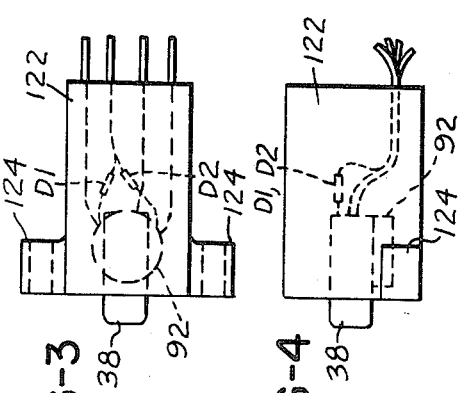
FIG. 3 is a plan view of the basic signal control unit mounted in the remote control station.
FIG. 4 is a side view of the aforementioned unit.
Figure 5:
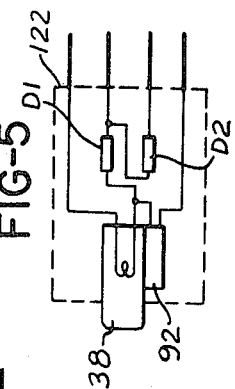
FIG. 5 is a schematic view showing the arrangement in the unit of the individual components thereof and the connections therebetween.

A particularly important component of the arrangement of the present invention will be seen within the dot-dash outline indicated at 120 in FIG. 2 and shown in detail in FIGS. 3, 4 and 5. This component is the combination of the call signal lamp 38 and the light sensitive resistor 92 and the diodes D1 and D2.

As will be seen in FIGS. 3 and 4, these components are encapsulated in a body 122 having wires extending therein and having apertured lugs 124 thereon for supporting the component at the remote station. The lamp 38, it will be noted, is immediate adjacent the light sensitive resistor 92 and, likewise, projects from the end of body 122 opposite the end thereof from which the wires extend so as to provide a signal for the remote operator when illuminated.

Conveniently, the components can be encapsulated in a rigid body so that if any one of the components fail, the body can readily be removed and replaced by another. The encapsulation is accomplished by the use of resinous potting compounds of well known compositions which set up rigidly under the action of a catalyst incorporated therein.

As will be apparent, the particular dispensing pump arrangement is only exemplary and the invention is broadly applicable to remote controlled liquid dispensing systems, particularly of the prepay or post pay types, regardless of the particular liquid dispensed therein and the specific type of dispensing apparatus.

Modifications may be made within the scope of the appended claims.

What is claimed is:

1. In a control system for a customer operated dispensing installation having dispensing pump means and a remote control station; each dispensing pump being normally disabled and having electrically energizable enabling means, a primary source of energy, a call switch at each dispensing pump actuable by a customer when dispensing from the respective pump is desired, signal means in said remote station in circuit with said call switch and said primary source of energy, and operable in response to actuation of said call switch, said signal means comprising an audible signal and a visual signal, an auxiliary source of energy under the control of said visual signal operable to maintain said visual signal energized following release of said call switch, a control switch in said remote station having a first set of contacts in circuit with said primary source of energy and a second set of contacts in circuit with said auxiliary source of energy, said control switch being actuatable by an operator in said remote station and operable when actuated to connect said enabling means to said primary source of energy while simultaneously interrupting said auxiliary source of energy to extinguish said visual signal.

2. A control arrangement according to claim 1 in which said dispensing pump means includes at least two individual dispensing pumps each having a respective call switch and a respective enabling means, said remote station comprising a said visual signal for each dispensing pump and a said control switch for each pump, said audible signal comprising a single audible signal device common to all of said dispensing pumps.

3. A control arrangement according to claim 2 which includes a diode interposed between said signal device and each said call switch, and a further diode interposed between each call signal lamp and the call switch pertaining thereto.

4. A control arrangement according to claim 2 which includes a lamp on each said dispensing pump connected to become energized when the enabling means pertaining to the respective dispensing pump is energized.

5. A control arrangement according to claim 2 which includes a first relay in said remote station energizable in response to actuation of each said control switch, energization of said first relay connecting said primary source of power to the respective said enabling means and interrupting the connection of said auxiliary source of power with the respective said signal lamp and also establishing a holding circuit for the said first relay, switch means on the respective dispensing pump actuated preparatory to a dispensing operation, a second relay in said remote station energizable in response to actuation of said switch, energization of said second relay interrupting the holding circuit to said first relay and establishing a connection from said primary source of power to said enabling means, energization of said second relay also connecting a counting device on the respective dispensing pump to a counting device pertaining to the respective dispensing pump in said remote location.

6. A control arrangement according to claim 5 in which energization of said second relay also interrupts the connection of said auxiliary source of power with the visual signal pertaining to the respective dispensing pump.

7. A control arrangement according to claim 3 in which said visual signal is a signal lamp, said auxiliary source comprising a light sensitive resistor connected in circuit with said lamp via said resistor, and said resistor being disposed adjacent said lamp so as to be illuminated thereby whereby energization of the signal lamp by closing of said call switch will establish said auxiliary source of power to maintain said lamp energized while extinguishing of said signal lamp will interrupt said auxiliary source of power, each said source of auxiliary power being connected to the respective signal lamp between the lamp and the said diode pertaining thereto.

8. A control arrangement according to claim 7 in which each said signal lamp and the light sensitive resistor and the diodes pertaining to the respective call switch are mounted in a body to form an integral units, said lamp projecting from one end of said body so as to be observable by the operator in said remote station.

9. A control arrangement according to claim 8 in which said body is in the form of an encapsulating resin.

10. A control arrangement according to claim 8 in which the electrical connection to the components in said body lead into the body from the end opposite the said one end thereof.

11. A control arrangement according to claim 10 in which said body comprises mounting lugs on the sides thereof.

* * * * *